Jan. 13, 1970   R. MANTEUFEL   3,489,208
REACTION COLUMN

Filed Feb. 16, 1968   3 Sheets-Sheet 1

INVENTOR
Rolf Manteufel

BY Stephens, Huettig and O'Connell
ATTORNEYS

Jan. 13, 1970  R. MANTEUFEL  3,489,208
REACTION COLUMN

Filed Feb. 16, 1968  3 Sheets-Sheet 2

INVENTOR

Rolf Manteufel

BY Stephens Huettig and O'Connell
ATTORNEYS

INVENTOR
Rolf Manteufel
BY Stephens, Huettig and O'Connell
ATTORNEYS

United States Patent Office 3,489,208
Patented Jan. 13, 1970

3,489,208
REACTION COLUMN
Rolf Manteufel, Hofheim, Taunus, Germany, assignor to Deutsche Gold- und Silber-Scheideanstalt vormals Roessler, Frankfurt am Main, Germany
Filed Feb. 16, 1968, Ser. No. 706,143
Int. Cl. F22b 9/12, 7/04; B01d 47/16
U.S. Cl. 165—109                                    9 Claims

ABSTRACT OF THE DISCLOSURE

A reaction column is filled with layers of hollow prismatic bodies having constricted waists. Adjacent layers are offset with respect to each other so that the flow through the column is both through the hollow bodies and the spaces between the bodies. This results in a more even mixing of the materials flowing through the column.

---

Figure 1:
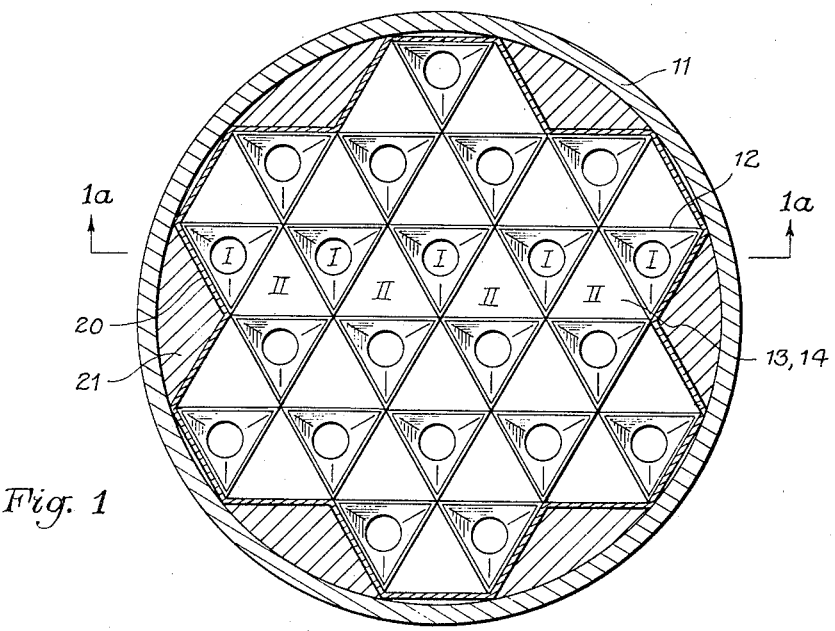

This invention relates to an apparatus for the direct heat exchange and/or exchange or matter in which it is necessary that the gases and/or steam and/or liquid or solid particles having various concentrations and/or temperatures must be brought in counterflow contact in order to make possible a maximum exchange of matter and/or heat.

It is necessary that no reverse mixing occurs in order to maintain the counterflow between the gases and/or steam and/or liquids or solid particles of matter.

In practice, this can be approximately achieved in that the particles of matter moving against each other are directed transversely to the flow direction into narrowly restricted chambers. However, during the diversion of large streams of matter into several of these relatively small chambers, there necessarily occurs that varying amounts of matter are distributed into the chambers. As a result, the ratio or relationship of the amounts of matter conducted in counterflow to each other is not the same in the individual chambers which causes an impairment of the heat exchange and/or matter exchange.

In sprinkler columns and those having filler bodies especially used for the heat exchange and/or matter exchange, the so-called irrigation sheet columns indeed have a small distance between the parallel vertical packets of sheets, but because of their relatively large side expansion, a uniform distribution across the entire surface is not possible. However, if the packets of parallel sheets are subdivided by additional surfaces which are vertical thereto or if vertical bundles of tubes are used, varying ratios of amounts of distributed matter again occur due to the difficulty of dividing or distributing the larger streams into a plurality of chambers and the heat exchange or matter exchange or process of mixing is again impaired.

It has been demonstrated that in columns having filler bodies the varying distribution of liquid through the irregular filter body layers, and especially because of the tendency of the increased flow adjacent the inner wall of the column, that the ratio of the quantity of the streams of matter that come in direct contact as well as the counterflow is grealy impaired so that large diameter exchange columns cannot be used with filler bodies. Also, the varying flow between and around the filler bodies has an effect on the quantity relationship and thus different density concentrations occur. Such varying quantity relationships are only partially equalized by the cross-mixing but this again necessarily results in an impairment of counterflow by the reverse mixing.

In bottom-type columns, certain liquid layers can be maintained through which the steam must flow so that the quantity relationship is maintained. However, a cross-flow prevails in the liquid layer which moves transversely of the bottoms. The upwardly flowing steam which, because of the cross-mixing between the bottoms, has approximately the same concentration and/or the same temperature and therefore is brought into contact with a liquid layer of decreasing concentration and increasing temperature, that is, one that comes to a boiling point easier. Further, only a relatively small part of the column volume is used for the actual material exchange. The greater portion of the column volume is used only for maintaining the counterflow because it is only needed for the purpose of overcoming the relatively large pressure loss for the discharge of the liquid.

Spray columns are also noted but they also have relatively large pressure losses since the entire amount of liquid must be sprayed in order to create a large surface area for the material and heat exchange.

This invention is not concerned with columns having mechanically movable inserts such as rotating and pulsating columns.

In the apparatus of this invention for the direct heat exchange and/or matter exchange or gas and liquid or solid matter exchange with or without a catalyst, the reaction column has as a layer of inserts a plurality of prismatic hollow bodies which have constricted waists in the center portions of the bodies and with the longitudinal axes of the bodies extending in the direction of the flow of the material through the bodies. Adjacent layers are offset from each other so as to form spaces between the outer surfaces of adjacent bodies. These spaces communicate with the interior of bodies in an adjacent layer so that the material flowing through the bodies can also flow into the spaces between the bodies while at the same time two separate flow path systems are maintained.

In this apparatus, it is possible to maintain the counterflow and/or concentration gradient and the heat along the longitudinal axis of the apparatus while eliminating the occurrence of varying quantity relationships in the plurality of individual streams of the flowing material.

Figure 1A:
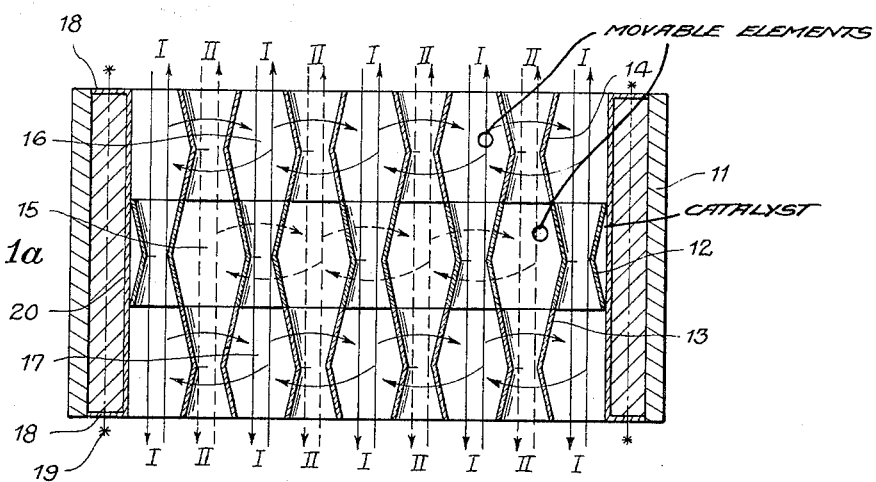
Figure 2:
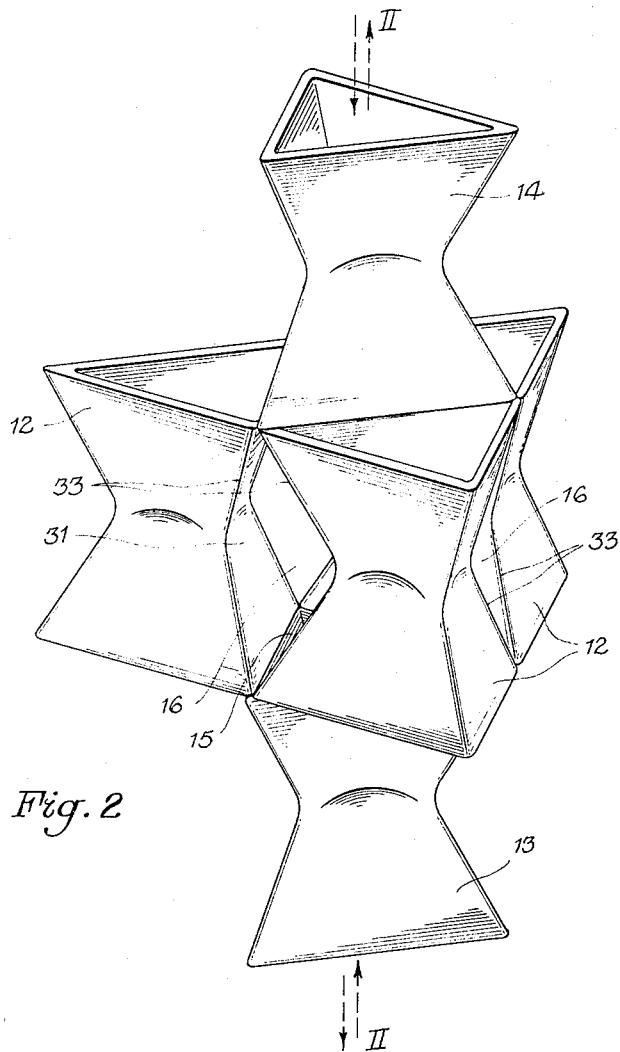
Figure 3:
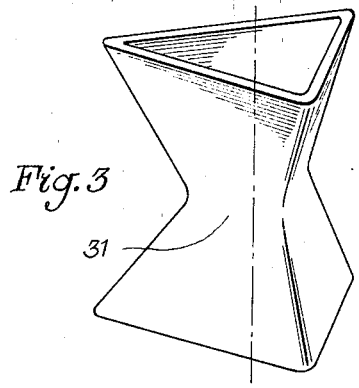
Figure 4:
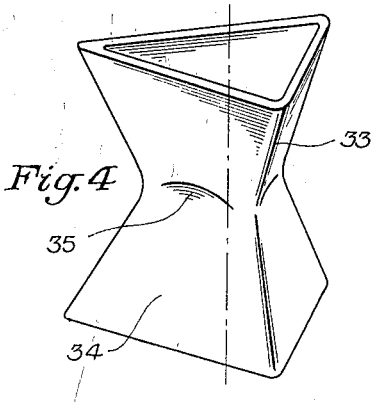
Figure 3A:
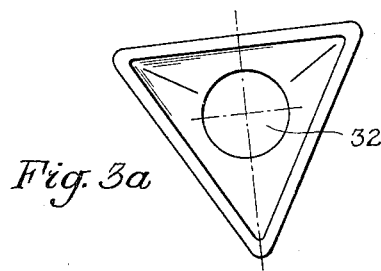
Figure 4A:
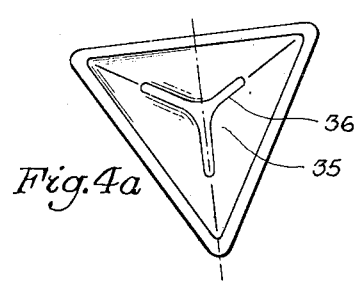
Figure 5:
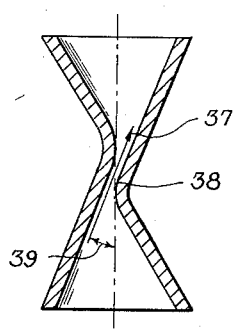
Figure 5A:
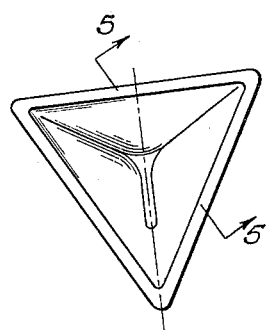

The means by which the objects of the invention are obtained are described more fully with reference to the accompanying drawings in which:

FIGURE 1 is a top plan view of the apparatus;
FIGURE 1a is a cross-sectional view taken on the line 1a—1a of FIGURE 1;
FIGURE 2 is a perspective view of a cluster of the prismatic bodies of this invention;
FIGURE 3 is a perspective view of one form of the bodies;
FIGURE 3a is a plan view of FIGURE 3;
FIGURE 4 is a perspective view of a modified form of one of the bodies;
FIGURE 4a is a plan view of FIGURE 4;
FIGURE 5 is a longitudinal cross-sectional view through a further modified body as taken on the line 5—5 of FIGURE 5a; and
FIGURE 5a is a plan view of FIGURE 5.

As shown in FIGURE 1, the column 11 contains the prismatic hollow bodies 12, 13 and 14, each of which has a constricted waist and with the hollow bodies extending in the direction of the flow of material through the apparatus. The various media, such as gas and/or steam and/ or liquid flowing through the column are divided into the main streams I and II which form a plurality of parallel individual streams I and/or II. As shown in FIGURE 1a, the individual streams I flow through the hollow bodies 12 which form a layer in the same plane while the individual streams II pass outside of and around bodies 12. By reason of the novelty of some of the streams passing around body 12, in one layer it is possible to combine with one another all individual streams II into the spaces between the outer surfaces of the bodies. It is further shown that with regard to the main streams I or II the flow through or around the hollow bodies takes place in alternate layers. For example, main stream II flows through bodies 13, around body 12, through body 14 and so forth, while main stream I parallel to stream II flows around body 13, through body 12, around body 14 and so forth. Also, all individual flows of stream I around bodies 13 and/or 14 are combined with one another in the spaces between adjacent bodies.

The perspective view in FIGURE 2 gives another showing of the function of the apparatus.

For example, one individual main stream II passes through body 13 into the exchange space 15 formed by the interior of body 13 and the outer surfaces 31 of body 12 and the interior of body 14. While the individual stream flows upwardly through body 13 toward body 14, the offsetting of the bodies 12 in the intermediate layer makes it possible for portions of the individual stream to move through the spaces 16 formed between the sides or outer surfaces 33 of body 12, with these spaces being parallel in the same plane. A second stream is in counterflow to stream II from the top to the bottom of the assembled bodies.

Generally, when prismatic three-sided bodies are used, five assembled bodies are needed to create the flow of this invention, while a hollow body of four sides needs six bodies, and a hollow body having five sides needs seven bodies.

The walls of the hollow bodies permit the formation of relatively large surface border areas as in the case of filler bodies in reaction columns, and because of the plurality of exchange spaces between the bodies, it has been found that the gaseous and/or liquid medium or solid particles are brought into contact at an increased velocity so that these dynamically operating exchange columns have a large capacity range and include thus the operating range of bottom columns as well as columns having filler elements and spray columns.

When the liquid capacity is small, then the material and/or heat exchange takes place on the surface areas formed by the bodies, while when the liquid capacity is large, the liquid is held in the exchange spaces so that the gas or steam must penetrate the liquid.

The bodies can be modified at different levels of their cross-sections and in their overall inside and outside shapes and also in their wall thicknesses.

As shown in FIGURES 3 and 3a, the hollow prismatic body has a constricted waist 31 which results in a circular opening 32 in the waist portion of the body. In the modification of FIGURES 4 and 4a, the prismatic body has sides 33 which are constricted at the center of the body and sides 34 which are also constricted to produce a waist 35 in such shape that three slots 36 are formed in the body in the form of a star.

As shown in FIGURES 5 and 5a, the sides of the hollow prismatic body can be pinched in such a manner that the axis 37 of the material flow are in slots 38 which form an acute angle 39 with the longitudinal axis of the body.

Because the hollow bodies are relatively small, it is possible to make them with small measurement tolerances. The bodies can be economically produced from known ceramics as well as from metals, synthetic materials or glass. This means that they can be easily made to meet surface corrosion and stress conditions on their surfaces. Also, the hollow bodies can be made of catalytic material for special cases or they can be coated with a special catalyst.

Because the layers of the hollow bodies are offset from each other in order to form the exchange spaces, it has been found that they have other advantages aside from their economical manufacture on a moving line as conventionally done. Such advantages are that, given the same outer body dimensions, only about half the number and thus only about half the amount of material is required. In other types of columns, the bodies have the advantage that it is possible to use the same size of bodies in the interiors of different sized columns.

Furthermore, it is possible to install movable elements in the intermediate or exchange spaces between adjacent bodies as, for example, balls which are used to clean the the surfaces to destroy foams, and to improve the exchange or mixing processes.

The hollow bodies can be individually inserted into the apparatus or they can be pre-assembled in layers and then inserted in the apparatus.

Hollow bodies which are made of metal can be rigidly connected to one another as by welding, soldering or by other connecting means. As shown in FIGURE 1, it is also possible to assemble one or a plurality of layers of the bodies and hold them between upper and lower sheets 18. These sheets have stamped openings with or without a flanged edge which corresponds with the maximum cross-sectional openings of the hollow bodies and the sheets are held together by rods 19.

Spaces can be formed between the outer periphery of the assembled bodies and the inner wall of the column which corresponds to the shape of the periphery of the outermost bodies.

As shown in FIGURE 1, ordinarily walls 20 are positioned between the interior wall of column 11 and the peripheral surface of the assembled bodies.

These spaces between the assembled bodies and the interior wall of the column can be closed by filler blocks 21 as the apparatus is assembled and with the blocks being smaller than the individual hollow bodies.

For the sake of completeness, it is noted that this apparatus and its operation can be used when the materials are in concurrent flow as well as in countercurrent flow, or can be used generally for the mixing of gases and/or liquids and/or solid particles since the same operational conditions must be maintained.

This invention has the final economic advantage for the insertion of bodies into the column by fulfilling the technical requirement for the smallest possible specific volume for exchange subject to good exchange of heat and/or matter or a good mixing process for the maximum throughput that can be determined for a given period of time while maintaining a given gradient concentration as well as being capable of mass assembly using cheaper ceramic materials because of their smaller dimensions.

Having now described the means by which the objects of the invention are obtained, I claim:

1. An apparatus for exchanging, heating or mixing materials such as liquids, gases or solid matter with or without a catalyst comprising a column, hollow prismatic bodies having constricted waists mounted in layers in said column with each layer being offset with respect to the adjacent layer so that the material flow through one layer communicates with the spaces between the outer surfaces of the bodies in an adjacent layer, and vice versa, while maintaining two separate flow path systems.

2. An apparatus as in claim 1, said bodies having star-shaped slots (36) formed by the constricted waists.

3. An apparatus as in claim 1, said bodies having inclined slots (38) formed by the constricted waists, said slots being inclined with respect to the longitudinal axes of said bodies and being in the direction of the material flow through the bodies.

4. An apparatus as in claim 1, said bodies having surfaces formed of a catalyst.

5. An apparatus as in claim 1, further comprising movable elements contained in the spaces between said bodies.

6. An apparatus as in claim 1, further comprising a unit composed of a plurality of said layers of bodies, and sheet means having openings corresponding to the openings into said bodies for containing said layers in said unit.

7. An apparatus as in claim 1, said bodies having corners turned toward the inner wall of said column.

8. An apparatus as in claim 7, the outer surfaces of said bodies located on the peripheries of said layers forming spaces between said layers and the inner wall of said column.

9. An apparatus as in claim 8, further comprising filler blocks in the spaces between said layers and the inner wall of said column.

References Cited

UNITED STATES PATENTS

| 2,408,164 | 9/1946 | Foster | 252—477 |
| 3,200,877 | 8/1965 | Lehmer et al. | 261—95 |
| 3,365,180 | 1/1968 | Lerner | 261—94 |

ROBERT A. O'LEARY, Primary Examiner

C. SUKAL, Assistant Examiner

U.S. Cl. X.R.

165—186; 252—477; 261—94